United States Patent
Tine et al.

(10) Patent No.: US 8,966,560 B2
(45) Date of Patent: Feb. 24, 2015

(54) METHOD AND APPARATUS FOR UPLOADING DATA

(71) Applicant: Motorola Solutions, Inc., Schaumburg, IL (US)

(72) Inventors: Steven D. Tine, Buffalo Grove, IL (US); Curt D. Croley, Stony Brook, NY (US); Kenneth W. Douros, South Barrington, IL (US); Craig A. Janssen, St. Charles, IL (US); Lester J. Miller, Plainfield, IL (US); Deborah J. Monks, Palatine, IL (US); Steven J. Nowlan, South Barrington, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 55 days.

(21) Appl. No.: 13/689,917

(22) Filed: Nov. 30, 2012

(65) Prior Publication Data

US 2014/0157344 A1      Jun. 5, 2014

(51) Int. Cl.
| | |
|---|---|
| *H04N 7/173* | (2011.01) |
| *H04N 21/239* | (2011.01) |
| *G08B 13/196* | (2006.01) |
| *G07C 5/08* | (2006.01) |
| *H04N 7/18* | (2006.01) |
| *G06Q 10/06* | (2012.01) |

(52) U.S. Cl.
CPC ........ *H04N 21/239* (2013.01); *G08B 13/19647* (2013.01); *G07C 5/0866* (2013.01); *G07C 5/0891* (2013.01); *H04N 7/181* (2013.01); *G06Q 10/06* (2013.01)
USPC ....................................................... 725/115

(58) Field of Classification Search
CPC .......... H04N 21/2187; H04N 21/2665; H04N 21/2743; H04N 21/4223
USPC ................... 725/80–81, 115, 75, 76; 348/148
See application file for complete search history.

(56) References Cited

U.S. PATENT DOCUMENTS

| | | | |
|---|---|---|---|
| 7,190,882 B2 | 3/2007 | Gammenthaler | |
| 8,363,102 B1 * | 1/2013 | Kadoch et al. | 348/148 |
| 2003/0035434 A1 * | 2/2003 | Le et al. | 370/443 |
| 2003/0229900 A1 | 12/2003 | Reisman | |

(Continued)

FOREIGN PATENT DOCUMENTS

| | | |
|---|---|---|
| AU | 2012206427 A1 | 8/2013 |
| WO | 2000077620 A2 | 12/2000 |

(Continued)

OTHER PUBLICATIONS

PCT International Search Report Dated Feb. 5, 2014 for Counterpart Application PCT/US2013/070609.

*Primary Examiner* — Benjamin R Bruckart
*Assistant Examiner* — Aklil Tesfaye
(74) *Attorney, Agent, or Firm* — Kenneth A. Haas

(57) ABSTRACT

A method and apparatus for uploading data is provided herein. During operation vehicles in the field will upload their digital multimedia evidence (DME) to a mobile/intermediary upload point(s). These mobile/intermediary upload points preferably comprise computers existing in other vehicles that are not currently connected to a central repository. A mobile recorder (mDVR) will choose a particular mobile/intermediary upload point(s) based on a probability that the mobile upload point(s) will return to a connected upload point to upload the transferred DME.

18 Claims, 2 Drawing Sheets

(56) References Cited

U.S. PATENT DOCUMENTS

| | | |
|---|---|---|
| 2004/0008255 A1* | 1/2004 | Lewellen .................... 348/148 |
| 2004/0177253 A1* | 9/2004 | Wu et al. .................... 713/176 |
| 2007/0219686 A1 | 9/2007 | Plante |
| 2008/0043104 A1 | 2/2008 | Silveranil et al. |
| 2008/0077290 A1 | 3/2008 | Weinmann et al. |
| 2008/0155634 A1 | 6/2008 | Khedouri et al. |
| 2009/0122142 A1* | 5/2009 | Shapley .................... 348/148 |
| 2009/0170537 A1* | 7/2009 | Mauti, Jr. .................... 455/466 |
| 2010/0020175 A1 | 1/2010 | Takada |
| 2010/0149335 A1* | 6/2010 | Miller, II .................... 348/148 |
| 2010/0274982 A1* | 10/2010 | Mehr et al. .................... 711/162 |
| 2011/0038264 A1* | 2/2011 | Ishii .................... 370/238 |
| 2013/0096731 A1* | 4/2013 | Tamari et al. .................... 701/1 |
| 2014/0025799 A1* | 1/2014 | Azizi et al. .................... 709/223 |

FOREIGN PATENT DOCUMENTS

| | | |
|---|---|---|
| WO | 2005016749 A1 | 2/2005 |
| WO | 2008118292 A2 | 10/2008 |
| WO | 2008151372 A1 | 12/2008 |

* cited by examiner

100

103

METHOD AND APPARATUS FOR UPLOADING DATA

FIELD OF THE INVENTION

The present invention generally relates to uploading data, and more particularly to a method and apparatus for uploading data to an intermediary device.

BACKGROUND OF THE INVENTION

Vehicles, such as busses, fire engines, police cars, etc., often include in-vehicle mobile digital video recording systems (mDVRs). These mDVR systems record the scene from the front window of the car as well as other views (e.g. out the back window, passengers in the back seat, etc). Aside from video, the mDVR also records audio and telemetry information such as vehicle speed, geographic position, and so on. Collectively, the content recorded in the mDVR is referred to as Digital Multimedia Evidence (DME), and is digitally stored on an in-vehicle repository (like a traditional spinning hard drive or solid state drive).

Depending on the resolution and quality of the video being recorded, the video portion of the DME can consume from 1.5 Mbp per second (Mbs) up to 5 Mbps of disk space per camera (the audio and telemetry data storage space, in comparison, is negligible). For a 2 camera system, a recording can therefore consume between 1 GB and 4 GB of disk space per hour. Consequently, at the end of a shift the mDVR storage repository can easily contain 10 GB or more of evidentiary data.

Typically, public-safety agencies upload all recordings from all vehicles to a long-term back end digital evidence management system (central repository). These backend systems enable users to review the DME, associate it with a court case, and manage the long-term retention time of the DME to align with state or local requirements. One or more mobile/intermediary upload points are used to transfer the DME from the vehicular storage device to the backend system. The transfer of the DME at the central repository typically occurs via one of three methods: physical removal of the storage device from the vehicle followed by connecting it to the backend; wired connection to the vehicle; or wireless upload. After upload is complete, it is typical for the DME to be deleted from the in-vehicle system or marked such that it can be overwritten when space on the drive is needed for new recordings.

Physically removing the storage media from the mDVR is an efficient way to put the vehicle back on the street quickly (by immediately replacing the storage device with an empty vessel) but it has many evidentiary and procedural drawbacks. To protect the evidence from an officer with malicious intent, the storage media is typically physically locked in the recording device. To remove it, an authorized officer—typically a supervisor—must unlock the device and remove the storage media, thus requiring a supervisor to spend a significant amount of time walking from car to car and collecting storage media. Also, this technique requires the supervisor to formally log that they picked up the storage media and when they submitted it for acceptance into the evidence management system to maintain the chain of evidence. While it enables vehicles to be quickly turned around, manual transfer is very costly to the agency from a personnel efficiency standpoint and consequently not the preferred upload method in the industry.

Wired upload is accomplished by connecting a physical wire to the vehicle, resulting in additional costs to the agency to run physical wires to multiple parking spaces at the station. Aside from the nuisance of connecting and disconnecting the wire to the vehicle, this method is also prone to damage to the upload equipment when officers accidentally depart without disconnecting first. There are also security concerns with having wires connected to the agency's network outside in an unsecured environment. While more agencies employ wired upload than manual transfer, wired upload is also not the preferred upload method in the industry due to the drawbacks noted above.

Due to the cost, inefficiency, chain of evidence, and security concerns of the other two approaches, the preferred method to upload the DME from the vehicle is to automatically perform a wireless transfer of the content once the vehicle enters the vicinity of an upload point to the central repository (such as the police station's parking lot, or near municipal buildings). The major challenge with this approach is that wirelessly transferring 10GB or more of DME data from multiple vehicles in a parking lot is a daunting task from a data transfer prospective. Even with a single vehicle in the parking lot, transferring 10GB+ of data over today's 802.11n technology (assuming a highly optimistic throughput of 150 Mbps) takes about 10 minutes. A parking lot full of vehicles at shift change that are all trying to upload at the same time will result in significantly longer transfer times, making it likely that DME upload will not complete before a new officer needs the vehicle to start the next shift. If an agency has a policy that all the DME must be uploaded prior to the vehicle being used again, this will delay putting that vehicle and that officer on the street.

The upload problem is further exacerbated when considering vehicles that do not return to the station parking lot (or other upload area) at the end of the shift. For example, it is typical for county or state police agencies to assign a vehicle permanently to an officer, who brings the vehicle home at the end of the workday and only return to a station/central repository rarely (like once a month). This means that easily 100 GB+ of DME may need to be offloaded on the rare occasions when the vehicle does return to the station. Not only does it take a tremendous amount of time to upload this quantity of content, but there may be recordings in the mDVR that are needed for evidentiary use, but are unavailable in the digital evidence management system until the upload takes place. Finally, if the storage media on the device becomes full, then the mDVR becomes unable to record new incidents and forces the officer to make a special trip to an upload point to the central repository to be able to create additional recordings.

Therefore, a need exists for a method and apparatus to upload data that reduces the time that a vehicle spends uploading DME. It would be beneficial if the method and apparatus also provided the uploading of DME in a more timely fashion for vehicles that do not regularly return to a station/upload area (e.g. state/county officers that bring their vehicles home with them).

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
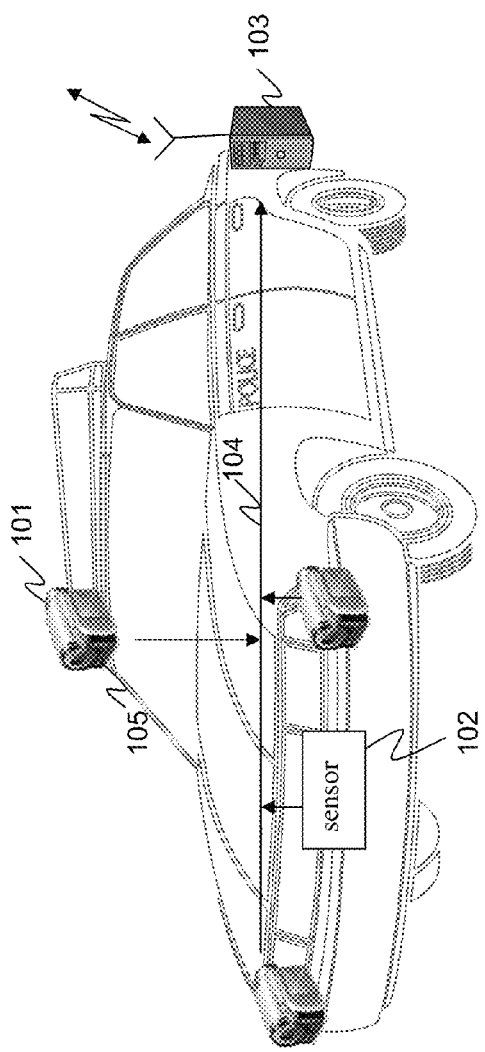
FIG. 1 illustrates a system for collection, storing, and uploading data.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for uploading data is provided herein. During operation, like during an incident response, vehicles in the field will upload their digital multimedia evidence (DME) to a mobile/intermediary upload point(s). These mobile/intermediary upload points preferably comprise computers existing in other vehicles that are not currently connected to a central repository. A mobile recorder (mDVR) will choose a particular mobile/intermediary upload point(s) based on a probability that the mobile upload point(s) will return to a connected upload point (a connected upload point is defined herein as an upload point that has direct connectivity to the central repository) to upload the transferred DME.

The above-technique provides for a system that 'cross-transfers' the DME from the original mDVR to one or more intermediary/mobile upload points, preferably prior to the original mDVR returning to the connected upload point. A mobile/intermediary upload point is any device that can hold DME but is not connected to the backend central repository. Examples of a mobile/intermediary upload point could be another mDVR unit in a different public-safety vehicle, it could be a special mDVR unit with an extra large storage media that is installed in, for example, a fire truck/engine or it could be a handheld device (smart phone, 2-way radio, etc) that is being carried by the officer. Once the DME has been cross-transferred to a mobile/intermediary upload point, each device will have a copy of the DME. The same DME can be cross-transferred to multiple mobile/intermediary upload points. Whenever one of the devices holding a copy of the DME has reached a connected upload point (like when the fire truck returns to the fire station), that DME is uploaded to the central repository (e.g., a backend evidence management system). When the DME upload is complete, a notification message is sent to all the devices that have the DME on their internal storage media and the DME can be either deleted from the in-vehicle system or marked such that it is not uploaded again and can be overwritten when space on the drive is needed for new recordings. This upload complete notification may occur immediately over a wide-area network connection or may occur at a later point in time (like when the in-vehicle system next connects to a connected upload point).

The above system results in DME being uploaded in a more timely fashion for vehicles that do not regularly return to a station/upload area as well as reducing the time that a vehicle spends uploading DME.

It should be noted that the above described technique for uploading video to an intermediary device achieves the best results when an appropriate intermediary device is chosen. In order to choose the best intermediary device, the mDVR should choose an intermediary device that has a higher probability of returning to a connected upload point than the mDVR. Ideally, if multiple mobile/intermediary upload points are available for utilization, the mobile/intermediary upload points chosen should all have a higher probability of returning sooner to a central repository upload point than the mDVR. In order to achieve this, each intermediary device may broadcast a calendar that indicates when it will be near a central repository upload point, and/or indicating how long the intermediary device will be at a particular scene. This information may be utilized when choosing an intermediary device. Alternatively, the system administrator may, at setup time, pre-provision each mobile/intermediary upload point with a relative priority value. For example, the system administrator may define fire vehicles as always having a higher priority value than police vehicles since fire vehicles typically return to the fire house immediately after an incident. Police incident command vehicles may be provisioned with a higher priority than normal police cruisers but with a lower priority than fire vehicles. Therefore, mDVR units would evaluate the relative priority values of all mobile/intermediary upload points available and choose the one with the highest priority.

Other factors may be taken into consideration when choosing an intermediary device. For example, the following may be considered when choosing an intermediary device:

A transfer speed between a donor device and an intermediary device may be considered such that connections with a higher transfer speed are preferred.

A transfer speed of the intermediary device to the eventual connected upload point may be considered such that connections with a higher transfer speed are preferred.

An available displaceable capacity of the intermediary device may be considered so that devices having a higher storage capacity are preferred.

A time to arrive at an upload location (station, court, jail, toll plaza, etc.) may be considered so that devices having a greater probability of returning to a connected upload point sooner in time are preferred.

An estimated congestion of the intermediary device when uploading to the central repository may be considered. For example, if one vehicle will be uploading to the central repository at the courts building in 1 hour where few other uploads will be occurring, it would be preferred over a vehicle going to the police station in one hour where several vehicles will be uploading to the repository at shift change.

An agency may be considered so that a within-agency transfer is preferred (e.g., a police to police transfer is preferred over for example police to fire transfer).

Turning now to the drawings wherein like numerals designate like components, FIG. 1 is a system for collection, storing, and uploading data. As shown, system 100 comprises a plurality of cameras 101 (only one labeled). In one embodiment one or more of the cameras are mounted upon a fixed or guidable/remotely positionable camera mounting 105. In another embodiment, at least one environmental sensor 102 is provided to separately record external stimuli such as speed, weather conditions, location, etc. Logic circuitry and storage unit 103 comprise a simple computer that serves to control camera mounts 105 and to record data from sensor(s) 102 and from cameras 101. Communication between elements of system 100 is accomplished via bus(es) 104 and/or wirelessly. Although not shown, there may comprise additional wiring such as between computer 103 and camera mounts 105 in order to remotely control camera mount positioning. In a preferred embodiment, system 100 is mounted upon and/or partially within a vehicle such as a bus, fire engine, or police patrol automobile, but alternatively may be worn by an individual such as a police officer.

Figure 2:
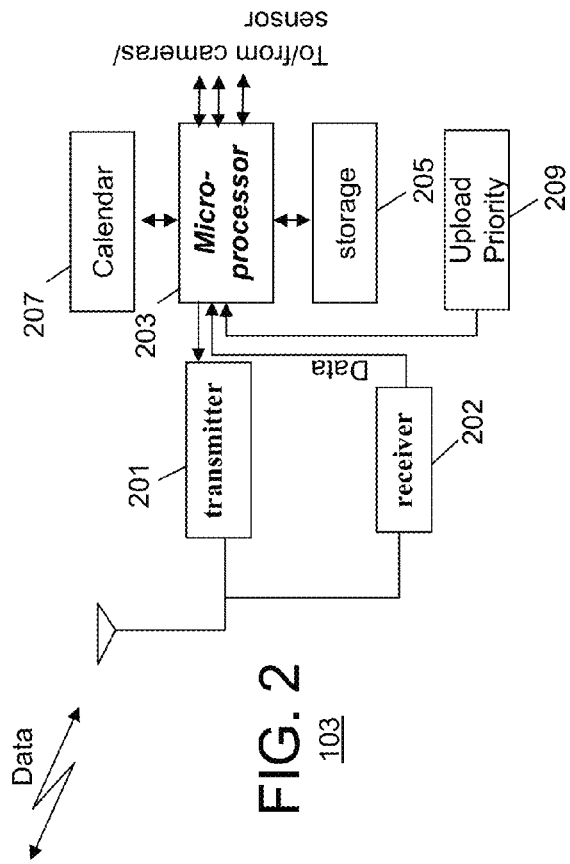
FIG. 2 is a block diagram of the computer of FIG. 1.

FIG. 2 is a block diagram of computer 103 serving as an mDVR. Computer 103 may serve as an mDVR wishing to offload DME to intermediary devices, or alternatively, may serve as an intermediary device, receiving DME from another mDRV 103. As shown, computer 103 comprises logic circuitry 203, receive circuitry 202, and transmit circuitry 201. Logic circuitry 203 comprises a digital signal processor (DSP), general purpose microprocessor, a programmable logic device, or application specific integrated circuit (ASIC) and is utilized to store DME received from cameras and sensors. Logic circuitry 203 may determine a priority of an intermediary device and transfer stored data to intermediary devices having a higher priority than other intermediary devices. Additionally receive and transmit circuitry are common circuitry known in the art for communication utilizing a well known communication protocol, and serve as means for transmitting and receiving messages and uploading DME to a central repository or downloading DME from another mDVR. For example, receiver 202 and transmitter 201 are well known transmitters that utilize the IEEE 802.11 communication system protocol. Storage 205 comprises standard random access memory and is used to store DME.

Optionally, calendar 207 is provided. Calendar 207 may exist in separate storage, or may be included within storage 205. Calendar 207 preferably contains information such as, but not limited to:
  a time period that computer 103 will remain at a particular scene;
  a time that computer 103 will be leaving a particular scene;
  a time that computer 103 will return to a central repository upload point; and
  a time that computer 103 will remain at a central repository upload point.

Finally, a priority 209 may be provided. The priority may simply comprise a number that indicates the computer's priority when acting as an intermediary device.

As an example of the above-described system in use, assume that there is a county police vehicle that does not return to a connected upload point on a regular basis because the officer brings his car home with him each night. Over the past week, a large amount of DME has been collected on his mDVR unit.

One day, the officer responds to an incident that is large enough to have multiple vehicles on-scene. There may be a fire truck/engine, an ambulance, and other police vehicles on scene. While on-scene, the police officer's mDVR unit automatically begins to use a vehicular area wireless network (like 802.11 n) to analyze calendars, data transfer rates, and available storage space for mobile/intermediary upload points (i.e., other computers 103 existing in the other vehicles on scene). A determination will be made of the best upload candidate(s) (described in detail below), and the DME will be transferred (uploaded) to the best upload candidate(s).

For example, assume a fire truck holding a computer 103 was determined to be the best upload candidate. DME transfer to the fire truck will then take place. It is acceptable that this transfer may take tens of minutes because the vehicles are on-scene responding to the incident.

The process of finding the mobile/intermediary upload points could be accomplished using any number of well-known 'service discovery' protocols so that the mDVR unit does not need to be pre-provisioned with the IP addresses of all mobile/intermediary upload points. Also, well known techniques can be used to ensure that a mobile/intermediary upload point is part of the same agency's fleet and should be trusted with a copy of the DME.

When the incident concludes, a plurality of vehicles depart from the scene each with a copy of some or all of the DME from the officer's vehicle.

Typically, at the end of an incident, the fire truck returns directly to the fire station. Upon returning to the station, the fire truck connects to the central repository and uploads the DME (both the fire truck's DME and the officer's DME). This upload is not as time sensitive as a normal police station upload because the fire truck spends a significant amount of time in the garage between incidents. Also, the fire truck always parks in the exact same spot in the garage so it is much easier to take advantage of directional high speed wireless technology like 60 GHz or even wired Ethernet (as the vehicle is in a secured garage and installation is much more cost effective).

Once the upload is complete, a message may be sent to all vehicles holding a copy of the DME (i.e., all computers 103 that were on scene), and the devices are notified that the DME has been uploaded. Alternatively, the message may occur when the vehicles holding a copy of the DME eventually connect to the upload point. This message may originate from computer 103 existing within the fire engine, or alternatively may originate from the central repository. Computers 103 holding a copy of the DME can delete the DME or mark it so that it is not uploaded again and can be overwritten when space on the drive is needed for new recordings.

To ensure the DME has not been modified during the cross-transfer and upload, well-known techniques can be used (like use of a digital signature) or it is also reasonable for more simplistic techniques to be used like having the central repository communicate with the original mDVR over the wide-area network (like 3G/4G data network) to obtain the cryptographic hash (like SHA1) of the original DME to compare with the hash of the uploaded DME. In one embodiment, the transfer and reception of DME may be practiced in a secure manner, for example, as described in US Pub. No. 2004/0177253, entitled AUTOMATED AND SECURE DIGITAL MOBILE VIDEO MONITORING AND RECORDING.

Figure 3:
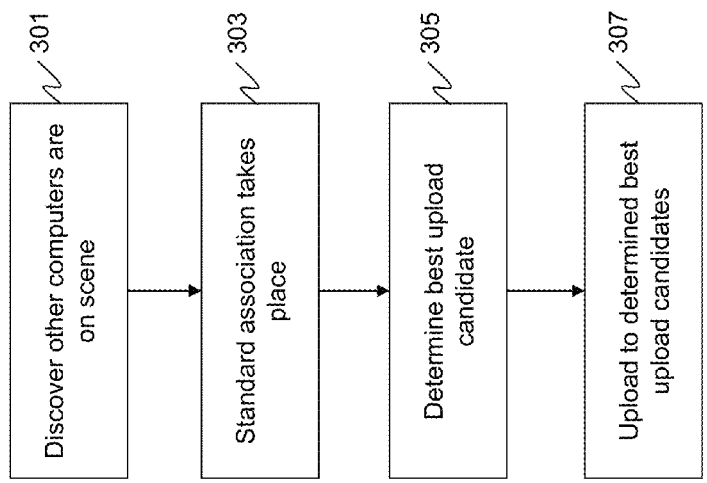
FIG. 3 is a flow chart showing operation of the computer of FIG. 1 when uploading data to another computer.

FIG. 3 is a flow chart showing operation of computer 103 (acting as an mDVR) when transferring DME to another computer 103. Thus, FIG. 3 shows those steps (some of which may be optional) for uploading data destined to a central repository, the data uploaded to an intermediary upload device 103 prior to being uploaded to the central repository. In this particular logic flow, it is assumed that data from cameras 101 and sensor 102 has been received by microprocessor 203 and stored in storage 205 as DME.

The logic flow begins at step 301 where microprocessor 203 discovers other computers (mobile/intermediary upload devices)103 are on scene (nearby). This discovery may be as simple as detecting a system ID via receiver 202 that has been broadcast from other computers 103. A standard association with the other computers takes place using microprocessor 203, transmitter 201 and receiver 202 (step 303).

At step 305 a best candidate for DME upload is determined, or alternatively a plurality of best candidates are determined by microprocessor 203. In one example, the best candidate(s) computers 103 are determined based on a priority. This priority may simply be a probability that they will return to a connected upload point in the near future (e.g., within the next several hours). This priority determination may take place via microprocessor 203 receiving multiple calendars 207 from each potential mobile/intermediary upload device 103 via receiver 202. These received calendars may be analyzed (along with other information like transfer rates) to determine the best candidate computer(s) by determining those mobile/intermediary upload devices with a higher probability of returning to the connected upload point. Those devices with a higher probability of returning to the connected upload point are given a higher priority.

In another example, the best candidate(s) computers 103 are determined based on an administrator pre-provisioned relative priority value 209 that is transmitted wirelessly from each intermediary/mobile device. When such a stored priority is utilized, microprocessor 203 will receive multiple priorities 209 from multiple computers 103 via receiver 202. These received priorities may be analyzed, and a transfer will be made to a computer 103 having a highest priority.

At step 307 the upload begins to the determined candidate computers 103 with microprocessor 203 transmitting data from storage 205 to the candidate computer(s) 103 via transmitter 201.

At a later point in time receiver 202 may receive an indication from a central repository (e.g., a back-end system) that the uploaded DME has been transferred to it by the candidate computer(s) and the uploaded DME may then be deleted from storage 205 or marked as already uploaded such that it can be deleted from storage 205 at a later time (like when space is needed).

It should be noted that in FIG. 3 the chosen mobile/intermediary upload device(s) chosen are not connected to the central repository when uploading the data. Additionally, the chosen devices may serve as mobile digital video recorders (mDVRs) within vehicles. Also, the data uploaded to the mobile/intermediary upload devices comprises digital multimedia evidence (DME).

Figure 4:
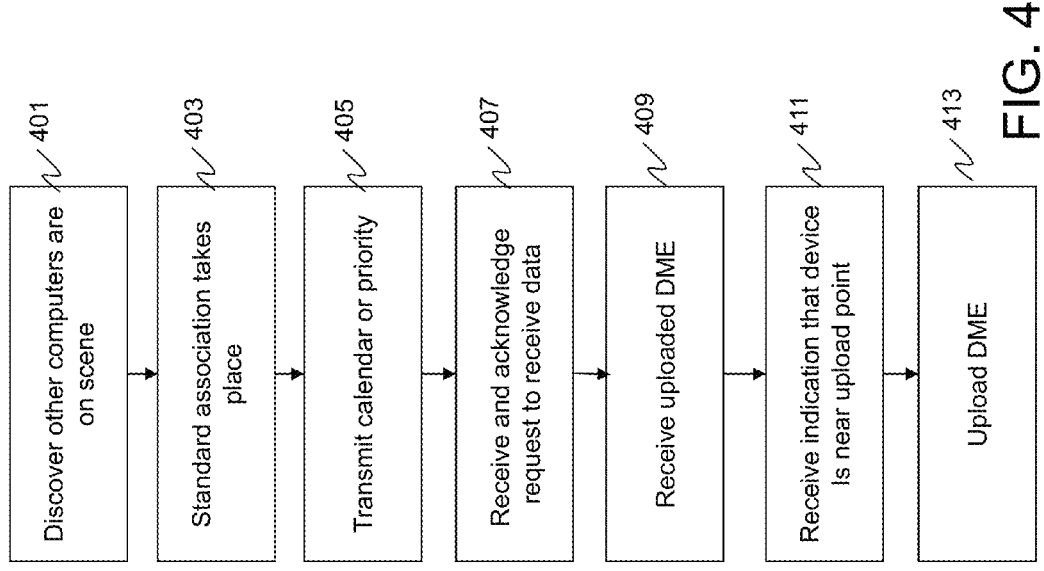
FIG. 4 is a flow chart showing operation of the computer of FIG. 1 when receiving data from another computer.

While the above description of FIG. 3 was given with the device 103 determining a priority based on a received calendar or simply based on a priority received from other devices 103, in alternate embodiments of the present invention the priority may be determined:
  based on a probability of a mobile/intermediary upload device returning to an upload point within a given period of time;
  based on an available disk space of a mobile/intermediary upload device;
  based on a time period that the mobile/intermediary upload device(s) will remain at the scene;
  based on a time that the mobile/intermediary upload device(s) will be leaving the scene;
  based on a time that the mobile/intermediary device will return to a central repository upload point;
  based on a time that the mobile/intermediary device will remain at the central repository;
  based on a transfer speed of the intermediary/mobile device such that connections with a higher transfer speed are preferred;
  based on an available displaceable capacity of the intermediary/mobile device(s) so that devices having a higher storage capacity are preferred;
  based on an estimated congestion of the intermediary/mobile device(s) when uploading to the central repository; or
  based on an agency so that a within-agency transfer is preferred;

FIG. 4 is a flow chart showing operation of the computer of FIG. 1 when receiving data from another computer. The logic flow begins at step 401 where microprocessor 203 discovers other computers 103 are on scene (nearby). This discovery may be as simple as detecting a system ID via receiver 202 that has been broadcast from other computers 103. A standard association with the other computers takes place using microprocessor 203, transmitter 201 and receiver 202 (step 403).

At step 405 calendar 207 or priority 209 is transmitted to all associated computers via transmitter 201. In response, a request to receive DME from another computer 103 is received and acknowledged (step 407). Receiver 202 then begins to receive uploaded DME, which is stored by microprocessor 203 in storage 205 (step 409). At a later point in time receiver 202 may receive an indication that it is near a connected upload point (step 411). This indication may be in the form of a simple system ID transmitted from an access point connected to the central repository. At step 413 the uploaded DME is transferred to the central repository and deleted from storage 205.

As discussed above, there may exist many techniques to determine candidate computers 103 for transmitting DME. These techniques may be made as described above, based on a received calendar, a priority, and a determined probability of returning to a connected upload point. However, other factors may additionally aide in determining a best candidate computer. Consider the general case of multiple vehicles at a single location, it would be ideal to transfer as much DME as possible. Also, consider the fact that multiple, simultaneous transfers may take place. A candidate computer(s) 103 may be determined based on a minimal transfer time (in lieu of or in addition to a probability of returning to the connected upload point), where Minimal Transfer Time=(DME size/transfer speed) where transfer speed is Min(upload speed donor vehicle, download speed of receiver vehicle). This avoids the situation of tying up a very high capacity receiver with a lengthy transfer from a slow donor.

With the above in mind, microprocessor 203 could calculate a priority for all computers 103 at the location (based on, for example, a highest value video clip vehicle is carrying). For each computer 103, a transfer time could be calculated, and if transfer time<estimated time on-scene, the particular computer would be added to a list of potential computers 103. The list of potential computers could then be sorted by storage capacity (fully available before displaceable, displaceable by priority of displaced video). Thus, those computers 103 with more storage space would be given priority over those computers 103 with less storage capacity.

The above-described technique results in a set of computers comprising:
  candidate computers capable of receiving the total DME transfer in a given time having a higher priority over those that cannot; and
  those computers 103 having adequate available disk space given priority over those that do not.

Once the set of candidate computers 103 have been determined, their calendars may be analyzed to determine the probability of returning to a connected upload point. Those with a higher probability of returning will be given priority.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for uploading digital multimedia evidence (DME) destined to a central repository, the DME uploaded to an intermediary upload device prior to being uploaded to the central repository, the method comprising the steps of:
    determining mobile/intermediary upload devices on scene;
    determining a probability for the mobile/intermediary upload devices to return to a connected upload point;
    determining those mobile/intermediary upload devices with a higher probability of returning to the connected upload point; and
    uploading the DME to mobile digital video recorders (mDVRs) on those mobile/intermediary upload devices with the higher probability of returning to the connected upload point, wherein the uploaded DME is stored on those mDVRs of mobile/intermediary upload devices with the higher probability of returning to the connected upload point.

2. The method of claim 1 wherein the mobile/intermediary upload device is not connected to the central repository when uploading the DME.

3. The method of claim 1 wherein the step of determining the probability for the mobile/intermediary upload devices to return to the connected upload point comprises the steps of:
    receiving a calendar from each potential mobile/intermediary upload devices; and
    analyzing the calendar(s) to determine the probability.

4. The method of claim 1 wherein the step of determining the probability for the mobile/intermediary upload devices to return to the connected upload point comprises the step of determining a priority transmitted from each mobile/intermediary upload device.

5. A method for uploading digital multimedia evidence (DME) destined to a central repository, the DME uploaded to a mobile/intermediary upload device prior to being uploaded onto the central repository, the method comprising the steps of:

determining mobile/intermediary upload device(s) on scene, wherein the mobile/intermediary upload device(s) on scene are not connected to the central repository; and uploading the DME to a mobile digital video recorder (mDVR) on at least one of the mobile/intermediary upload device(s) on scene, wherein the uploaded DME is for storage on the mDVR of at least one mobile/intermediary upload devices.

6. The method of claim 5 further comprising the steps of:
determining those mobile/intermediary upload device(s) with a higher priority; and
wherein the step of uploading comprises uploading the DME to the device(s) with the higher priority.

7. The method of claim 6 wherein the priority is based on a probability of a mobile/intermediary upload device returning to an upload point within a given period of time.

8. The method of claim 6 wherein the priority is based on an available disk space.

9. The method of claim 6 wherein the priority is based on a time period that the mobile/intermediary upload device(s) will remain at the scene.

10. The method of claim 6 wherein the priority is based on a time that the mobile/intermediary upload device(s) will be leaving the scene.

11. The method of claim 6 wherein the priority is based on a time that the mobile/intermediary device will return to a central repository upload point.

12. The method of claim 6 wherein the priority is based on a time that the mobile/intermediary device will remain at the central repository.

13. The method of claim 6 wherein the priority is based on a transfer speed of the intermediary/mobile device such that connections with a higher transfer speed are preferred.

14. The method of claim 6 wherein the priority is based on an available displaceable capacity of the intermediary/mobile device(s) so that devices having a higher storage capacity are preferred.

15. The method of claim 6 wherein the priority is based on an estimated congestion of the intermediary/mobile device(s) when uploading to the central repository.

16. The method of claim 6 wherein the priority is based on an agency so that a within-agency transfer is preferred.

17. The method of claim 6 wherein the priority is based on an administrator pre-provisioned relative priority value that is transmitted wirelessly from each intermediary/mobile device.

18. An apparatus for uploading digital multimedia evidence (DME) destined to a central repository, the DME uploaded to a mobile/intermediary upload device prior to being loaded onto the central repository, the apparatus comprising:
a processor determining mobile/intermediary upload device(s) on scene, wherein the mobile/intermediary upload device(s) on scene are not connected to the central repository; and
a transmitter uploading the DME to at least one mobile digital video recorder (mDVR) on the mobile/intermediary upload device(s) on scene, wherein the uploaded DME is for storage on at least one mDVR of the mobile/intermediary upload device(s).

* * * * *